Patented Apr. 19, 1932

1,854,899

UNITED STATES PATENT OFFICE

VICTOR MORITZ GOLDSCHMIDT, OF OSLO, NORWAY

PROCESS OF MAKING REFRACTORY INSULATING MATERIAL

No Drawing. Application filed February 1, 1929, Serial No. 336,905, and in Germany January 25, 1928.

This invention relates to an insulating material which can withstand the action of high temperatures without any substantial losses of its thermic insulating property.

It has been found that this requirement is fulfilled in an excellent manner by the use of magnesium ortho-silicate. The practical application of the invention is not limited to synthetically manufactured magnesium ortho-silicate. On the contrary, it has been found that also naturally occurring magnesium ortho-silicates such as for instance olivine (peridotite dunite) or natural products which are capable of being converted by a suitable treatment into magnesium ortho-silicate, could be used.

The manufacture of refractory porous masses or compositions which poorly insulate heat, from such raw materials, could be effected in the simplest manner for instance by first effecting a division of the material such as for instance natural olivine rock, to grains of such a size that the mass to be prepared from it, shows a sufficiently great pore volume. If desired, naturally occurring olivine sand which has the corresponding size of grain or has been brought to the suitable size of grain, could also be used entirely or in part.

Filling, packing, intermediate layers and the like in furnaces and other apparatus could then be prepared from such raw materials, for instance by introducing if desired, ramming in, into such spaces the material in the form of powder or grain or of powder and grain, alone or also, if desired, with simultaneous use of small quantities of binding substances or binders.

The proceeding could also be for instance such that first such raw material would be converted into coherent porous masses or moulded parts, and the latter used then for the manufacture of insulating walls or the like. Such moulded parts could be obtained for instance by moulding in accordance with the usual methods, olivine rock reduced to suitable size of grain, if desired with co-operation of binding substances or for instance of substances which have the property of producing by chemical reaction compounds which have a cementing action, and by heating the moulded parts to suitable temperatures, in which case the heating could be effected if desired entirely or partly first at the place of utilization. Care must be of course taken in such a case to see that the conversion of the raw material in the state of powder or grains into moulded bodies shall take place in conditions in which the required porosity is maintained.

According to one method of carrying the invention into practical effect, the manufacture of insulating filling, packing, layers or of moulded bodies for the manufacture of insulating walls or layers takes place with co-operation of substances which have the property of increasing the porosity of the finished insulating masses. For instance, to the raw material in the form of powder or grains, substances can be added which are eliminated by the action of high temperatures and leave behind hollow spaces. As such substances for instance saw dust can be used or peat powder, cork waste, coal, anthracite, and other organic substances.

The material which evolves gases when burning and thus assumes a cellular structure is preferably used in the form of round, roundish or ovoid grains of fairly uniform size, since round-shaped cells lend better mechanical properties to the finished stone. Suitable organic natural products such as maize grains, rice husks and the like may likewise be used. If desired, binding substances of organic nature could be used which first bind or cement together the olivine particles, but after a subsequent heating are eliminated and leave behind suitable hollow spaces.

Further, the proceeding could also be for instance such that during the manufacture of the insulating masses and the like, with the raw materials such as olivine or the like, would be incorporated additions which, owing to gas generation, produce hollow spaces, such as for instance magnesium carbonate, magnesium nitrate, aluminium nitrate or the like or for instance "driving" substances which, under the action of water, generate gas bubbles, such as for example small quantities of metals such as aluminium, calcium and the like, or for example carbides. The choice of the additions must be of course made in such a manner that they themselves and the products of their reaction shall not reduce to an injurious extent the refractory property of the insulating masses.

For carrying the invention into practical effect could be used, in addition to natural rocks rich in magnesium ortho-silicate, among others also such cheap natural products as can be converted by a suitable preliminary treatment into products rich in magnesium ortho-silicate. For instance, olivines which in addition to magnesium ortho-silicate, contain also other magnesium silicates, for instance magnesium hydro-silicates, for instance olivine rock containing serpentine, could be converted into an insulating material suitable for the present invention by heating to suitable temperatures, for instance such as 800–1000°. Further for instance serpentine and other magnesium hydro-silicate could be converted by heating with suitable magnesium compounds such as for instance magnesiumoxide, magnesite and the like, into products containing substantially magnesium ortho-silicate, and these products could then be converted according to the invention into insulating substances and the like.

The porous insulating masses constituted by or manufactured from magnesium ortho-silicate or constituted or manufactured from products rich in magnesium ortho-silicate have the great advantage that they can retain their heat insulating property permanently even in the case of action of high temperatures. The insulating material may be therefore used successfully for all the purposes in which it is exposed to high thermic stresses. It possesses further also the advantage of having a considerable resistance to the actions of chemical nature. As field of application may be mentioned among others industrial furnaces of the most varied kind, such as for instance metallurgical furnaces, coke ovens, calcining or annealing furnaces and the like.

I claim:

1. A process for the production of a highly refractory insulating material comprising mixing a natural product rich in magnesium orthosilicate with a substance rich in magnesium taken from a group consisting of magnesium oxide or magnesite and with a substance taken from a group consisting of sawdust, peat powder, cork waste, coal, anthracite, maize grains, rice husks and similar organic and inorganic bodies, and then heating said mixture to a high temperature so as to cause said last mentioned substance to burn with the formation of a gas and thereby leave behind pores in the material, said heating however being limited to a temperature which is below the fusing temperature of said mixture.

2. A process for the production of a highly refractory insulating material comprising mixing olivine with a substance rich in magnesium taken from a group consisting of magnesium oxide or magnesite and with a substance taken from a group consisting of sawdust, peat powder, cork waste, coal, anthracite, maize grains, rice husks and similar organic and inorganic bodies, and then heating said mixture to a high temperature so as to cause said last mentioned substance to burn with the formation of a gas and thereby leave behind pores in the material, said heating however being limited to a temperature which is below the fusing temperature of said mixture.

3. A process for the production of a highly refractory insulating material comprising mixing a natural product rich in magnesium orthosilicate with a substance rich in magnesium taken from a group consisting of magnesium oxide or magnesite and with a substance taken from a group consisting of sawdust, peat powder, cork waste, coal, anthracite, maize grains, rice husks and similar organic and inorganic bodies, moistening said mixture, molding said mixture, and then heating said mixture to a high temperature so as to cause said last mentioned substance to burn with the formation of a gas and thereby leave behind pores in the material, said heating however being limited to a temperature which is below the fusing temperature of said mixture.

4. A process for the production of a highly refractory insulating material comprising mixing a natural product rich in magnesium orthosilicate with a substance rich in magnesium taken from a group consisting of magnesium oxide or magnesite and with a substance taken from a group consisting of sawdust, peat powder, cork waste, coal, anthracite, maize grains, rice husks and similar organic and inorganic bodies, adding a binding to said mixture, moistening said mixture, molding said mixture, and then heating said mixture to a high temperature so as to cause said last mentioned substance to burn with the formation of a gas and thereby leave behind pores in the material, said heating however, being limited to a temperature which is below the fusing temperature of said mixture.

5. A process for the production of a highly refractory insulating material comprising mixing a natural product rich in magnesium orthosilicate with a substance rich in magnesium taken from a group consisting of magnesium oxide or magnesite and with a combustible substance, and then heating said mixture to a high temperature so as to cause said last mentioned substance to burn with the formation of a gas and thereby leave behind pores in the material, said heating however being limited to a temperature which is below the fusing temperature of said mixture.

6. A process for the production of a highly refractory insulating material comprising mixing a natural product rich in magnesium orthosilicate with a substance rich in magnesium taken from a group consisting of magnesium oxide or magnesite and with granular coke, and then heating said mixture to a high temperature so as to cause said last mentioned substance to burn with the formation of a gas and thereby leave behind pores in the material, said heating however being limited to a temperature which is below the fusing temperature of said mixture.

7. A process for the production of a highly refractory insulating material comprising mixing a natural product rich in magnesium orthosilicate divided into granules of various dimensions with a substance rich in magnesium taken from a group consisting of magnesium oxide or magnesite and with a substance taken from a group consisting of sawdust, peat powder, cork waste, coal, anthracite, maize grains, rice husks and similar organic and inorganic bodies, and then heating said mixture to a high temperature so as to cause said last mentioned substance to burn with the formation of a gas and thereby leave behind pores in the material, said heating however being limited to a temperature which is below the fusing temperature of said mixture.

8. A process for the production of a highly refractory insulating material comprising mixing olivine with a combustible material, then heating said mixture in the presence of magnesium oxide to a high temperature in order to leave behind pores in the material, said heating being limited to a temperature below the fusing point of said material.

In testimony whereof I affix my signature.

VICTOR MORITZ GOLDSCHMIDT.